United States Patent
Bent et al.

(10) Patent No.: US 9,667,719 B1
(45) Date of Patent: May 30, 2017

(54) PARALLEL STORAGE SYSTEM WITH MULTI-TIER HARDWARE ACCELERATED PARTITIONED KEY-VALUE STORAGE

(71) Applicant: EMC IP Holding Company LLC, Hopkinton, MA (US)

(72) Inventors: John M. Bent, Los Alamos, NM (US); Sorin Faibish, Newton, MA (US); James Pedone, West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 328 days.

(21) Appl. No.: 14/318,913

(22) Filed: Jun. 30, 2014

(51) Int. Cl.
*G06F 15/167* (2006.01)
*H04L 29/08* (2006.01)

(52) U.S. Cl.
CPC .......... *H04L 67/1097* (2013.01); *H04L 67/06* (2013.01)

(58) Field of Classification Search
CPC .......................... H04L 67/1097; H04L 67/06
See application file for complete search history.

(56) References Cited

U.S. PATENT DOCUMENTS

| | | | | |
|---|---|---|---|---|
| 9,235,609 B1* | 1/2016 | Pandey | ............. | G06F 17/30309 |
| 2011/0276744 A1* | 11/2011 | Sengupta | ............ | G06F 12/0866 |
| | | | | 711/103 |
| 2013/0227194 A1* | 8/2013 | Kannan | ............... | G06F 15/7821 |
| | | | | 711/103 |
| 2014/0351300 A1* | 11/2014 | Uppu | .................. | H04L 12/6418 |
| | | | | 707/827 |
| 2015/0261563 A1* | 9/2015 | Guerin | ............. | G06F 17/30979 |
| | | | | 707/703 |

OTHER PUBLICATIONS

James Nunez, "Multi-Dimensional Hashed indexed Metadata/Middleware (MDHIM) Project", Ultrascale Systems Research Center High Performance Computing Systems Integration (May 10, 2012).

* cited by examiner

*Primary Examiner* — June Sison
*Assistant Examiner* — Dixon Dabipi
(74) *Attorney, Agent, or Firm* — Ryan, Mason & Lewis, LLP

(57) ABSTRACT

Parallel storage systems are provided with a multi-tier hardware accelerated partitioned key-value store. A distributed storage system for storing a partitioned key-value store comprises at least one compute node comprising a partitioned key-value store server; the partitioned key-value store server being configured to store key-value data on at least one hardware accelerated key-value store. The hardware accelerated key-value store comprises, for example, a flash-based hardware accelerated key-value store and/or a disk-based hardware accelerated key-value store. The compute nodes optionally further comprise a local key value store for generating one or more of read and write commands for the flash-based hardware accelerated key-value store and/or the disk-based hardware accelerated key-value store. The partitioned key-value store servers optionally provide an interface between one or more local key-value stores and the flash-based hardware accelerated key-value store and/or the disk-based hardware accelerated key-value store.

20 Claims, 7 Drawing Sheets

```
                                                              ┌─700
mdhim_put(key=k,value=v) {
    switch (local_store) {
    case LEVELDB:
    case PBLISAM:
        /* make function call to software library which enters into deep
software stack and results in storage system call like a POSIX write */
    case Disk-Based Hardware Accelerated K/V Store:
    case Flash-Based Hardware Accelerated K/V Store:
        /* make direct call to the hardware layer. */
    }

}
```

PARALLEL STORAGE SYSTEM WITH MULTI-TIER HARDWARE ACCELERATED PARTITIONED KEY-VALUE STORAGE

CROSS-REFERENCE TO RELATED APPLICATIONS

The present application is related to U.S. patent application Ser. No. 14/143,749, filed Dec. 30, 2013, entitled "Parallel Storage System with Burst Buffer Appliance for Storage of Partitioned Key-Value Store Across a Plurality of Storage Tiers," incorporated by reference herein.

FIELD

The field relates generally to data storage, and more particularly, to partitioned key-value stores.

BACKGROUND

Key-value stores are a powerful tool to store and retrieve large amounts of data for activities such as data analysis. One difficulty in creating these key-value stores is the need for parallelism. The large amount of data that must be stored makes a key-value store on a single node impractical for most workloads. Thus, distributed key-value stores have been proposed for storing a partitioned key-value store (often referred to as a partitioned data store) on a number of parallel nodes.

Multidimensional Data Hashing Indexing Middleware (MDHIM) is an example of a framework for partitioned data stores. In a typical MDHIM implementation, one or more MDHIM clients run on each of the compute nodes and communicate with a plurality of MDHIM servers also running on the same or different compute nodes in a parallel file system. Each MDHIM server stores a partition of the key-value store. A given MDHIM server storing a particular sub-range of the key-value store is contacted to read or write key-values within the sub-range.

One challenge in a partitioned key-value store is the amount of key-value data that must be transferred, stored and processed. Thus, MDHIM employs low-latency Message Passing Interface (MPI) communications across the user-space of high performance computing (HPC) compute nodes to create a single virtual key-value store across a set of local key-value stores using ordered key-ranges.

The application layer for data-driven applications typically employs an object-oriented approach, while the hardware layer (e.g., disk-based storage or flash-based storage) typically employs block-based storage. Thus, multiple layers of software and hardware are often stacked together in order to enable making the two domains compatible. In order to store application data, multiple layers of data manipulation and hardware domains must be traversed. For example, middleware is often employed to perform data format conversions.

While MDHIM has significantly improved the performance of partitioned data stores in an HPC environment, a need remains for more efficient techniques for storing key-value data. A further need exists for techniques for storing key-value data generated by object-oriented applications using hardware accelerated key-value stores that are optimized for the storage of key-value data.

SUMMARY

Illustrative embodiments of the present invention provide parallel storage systems with a multi-tier hardware accelerated partitioned key-value store. In one embodiment, a distributed storage system for storing a partitioned key-value store comprises at least one compute node comprising a partitioned key-value store server; the partitioned key-value store server being configured to store key-value data on at least one hardware accelerated key-value store. The hardware accelerated key-value store comprises, for example, a flash-based hardware accelerated key-value store and/or a disk-based hardware accelerated key-value store.

The at least one compute node optionally further comprises a local key value store for generating one or more of read and write commands for the flash-based hardware accelerated key-value store and the disk-based hardware accelerated key-value store.

In one exemplary embodiment, a plurality of partitioned key-value store servers each store a globally sorted range of keys in the partitioned key-value store. In another exemplary embodiment, a plurality of partitioned key-value store servers each store a locally sorted range of keys.

The partitioned key-value store servers optionally provide an interface between one or more local key-value stores and the flash-based hardware accelerated key-value store and/or the disk-based hardware accelerated key-value store.

As noted above, illustrative embodiments described herein provide significant improvements relative to conventional arrangements. In some of these embodiments, use of a hardware accelerated flash-based key-value store in conjunction with a hardware accelerated disk-based key-value store allows dynamic balancing of storage capacity and IO throughput requirements in a partitioned key-value store, thereby allowing particular levels of performance to be achieved at a significantly lower cost and with greater efficiency than would otherwise be possible. Similar improvements are provided using other numbers and types of storage tiers within the multi-tier hardware accelerated partitioned key-value store than the flash-based and disk-based key-value storage tiers specifically described herein, with migration between the tiers being controlled by one or more syncer applications or burst buffers of the multi-tier hardware accelerated partitioned key-value store.

BRIEF DESCRIPTION OF THE DRAWINGS

FIG. 7 illustrates exemplary pseudo code for implementing a multi-tier hardware accelerated partitioned key-value store.

DETAILED DESCRIPTION

Illustrative embodiments of the present invention will be described herein with reference to exemplary partitioned data stores and associated clients, servers, storage arrays and other processing devices. It is to be appreciated, however, that the invention is not restricted to use with the particular illustrative partitioned data stores and device configurations shown. Accordingly, the terms "partitioned data store" and "partitioned key-value store" as used herein are intended to be broadly construed.

Aspects of the present invention provide parallel storage systems with a multi-tier hardware accelerated partitioned key-value store. While the exemplary embodiments of the present invention employ MDHIM, other MPI-Linked partitioned data stores can be employed, as would be apparent to a person of ordinary skill in the art. As discussed further below, key-value data can be stored on first and second storage tiers comprising respective disjoint subsets of storage. In this manner, an expanded storage footprint is provided, including multi-tier key-value storage.

According to another aspect of the invention, one or more servers in the disclosed partitioned key-value store provide an interface between one or more local key-value stores and one or more additional storage architectures. In addition, one or more servers in the disclosed partitioned key-value store optionally provide a key value interface that provides access to at least one hardware accelerated key-value store.

As used herein, a hardware accelerated key-value store comprises a key-value store that is substantially optimized for the storage of key-value data and/or communication using keys and values, thereby allowing direct calls to the hardware layer. For example, the DSSD flash storage system from EMC Corp. comprises a key-value flash-based storage system and the Kinetic Open Storage platform from Seagate Technology LLC comprises a key-value disk-based storage system.

According to a further aspect of the invention, the local key-values are optionally sorted both locally by the local store and globally by the overall MDHIM framework. Another aspect of the invention leverages the local and global sorting to provide batch input/output (TO) operations that aggregate multiple requests into batch operations on one or more sorted ranges. In this manner, desired data can be obtained using a reduced number of messages over the network.

Figure 1:
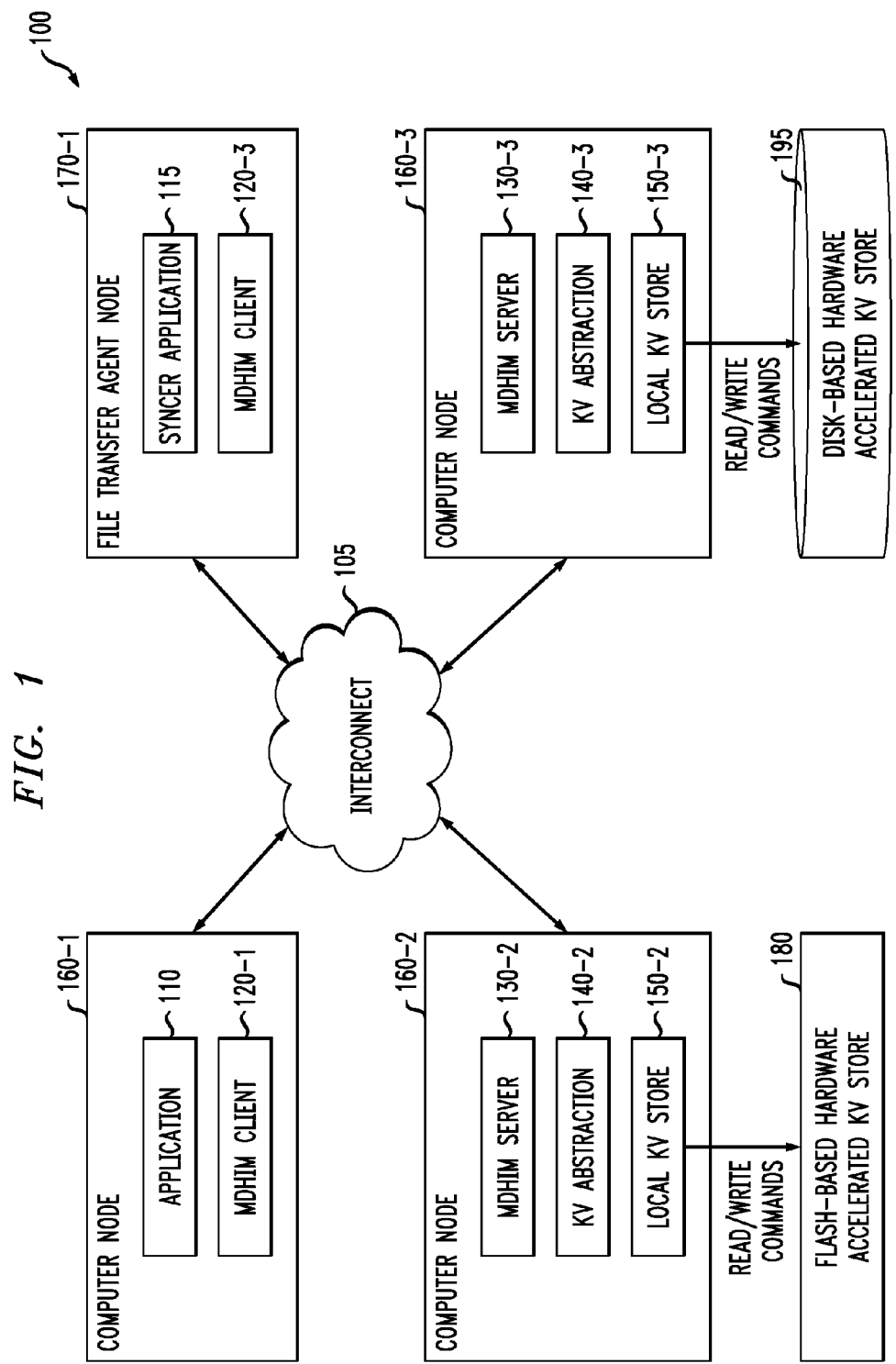
FIG. 1 illustrates an exemplary multi-tier hardware accelerated partitioned key-value store incorporating aspects of the invention.

FIG. 1 illustrates an exemplary partitioned key-value (KV) store 100 incorporating aspects of the invention. As shown in FIG. 1, the exemplary partitioned key-value store 100 comprises an exemplary application, such as application 110, on a first compute node 160-1 that can read, write and/or query key-value data in the exemplary partitioned key-value store 100, using one or more MDHIM clients, such as the exemplary MDHIM client 120-1.

In one exemplary embodiment, one or more MDHIM servers that host flash-based key-value storage, such as MDHIM server 130-2, control the storage of key-value data on flash storage using a key-value abstraction layer 140-2 and a local key-value store 150-2 on a second compute node 160-2 in a high performance computing (HPC) environment. Generally, as discussed further below, the local key-value store 150-2 processes key-value operations such as leveldb or pblisam. As shown in FIG. 1, the local key-value store 150-2 communicates with a flash-based hardware accelerated key-value store 180 to store key-value data on a flash storage tier.

In addition, one or more MDHIM servers that host disk-based key-value storage, such as MDHIM server 130-3, control the storage of key-value data on disk storage using a key-value abstraction layer 140-3 and a local key-value store 150-3 on a third compute node 160-3 in a high performance computing (HPC) environment. Generally, as discussed further below, the local key-value store 150-3 processes key-value operations such as leveldb or pblisam. As shown in FIG. 1, the local key-value store 150-3 communicates with a disk-based hardware accelerated key-value store 195 to store key-value data on a disk storage tier.

In one exemplary embodiment, a syncer application 115 executing, for example, on a file transfer agent node 170-1, controls the migration of data from the flash-based hardware accelerated key-value store 180 to the disk-based hardware accelerated key-value store 195, and records where data is stored (e.g., tier and range information) using an MDHIM client 120-3, in a known manner.

The various exemplary nodes 160-1 through 160-3 and 170-1 in the exemplary partitioned key-value store 100 communicate using an interconnect 105.

An exemplary architecture for an MDHIM partitioned key-value store is discussed further below in conjunction with FIG. 2. For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

While the exemplary embodiment employs flash memory for the high-speed memory of the flash-based hardware accelerated key-value store 180, other types of low-latency memory could be used instead of flash memory. Typically, such low-latency memories comprise electronic memories, which may be implemented using non-volatile memories, volatile memories or combinations of non-volatile and volatile memories. Accordingly, the term "flash-based hardware accelerated key-value store 180" as used herein is intended to be broadly construed, so as to encompass any network appliance or other arrangement of hardware and associated software or firmware that collectively provides a high-speed memory.

One or more of the exemplary nodes 160-1 through 160-3 and 170-1 in the exemplary partitioned key-value store 100 comprise a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code. Also included in one or more of the exemplary nodes 160-1 through 160-3 and 170-1 is network interface circuitry. The network interface circuitry allows the exemplary nodes 160 to communicate over the network with other devices. The network interface circuitry may comprise, for example, one or more conventional transceivers.

The hardware acceleration and/or storage tiering functionality of the exemplary partitioned key-value store 100 may be implemented at least in part in the form of software that is stored in memory and executed by a processor.

The nodes 160-1 through 160-3 and 170-1 (or portions thereof) comprising processor, memory and network interface components as described above is an example of what is more generally referred to herein as a "processing device." Each of the devices herein may similarly be implemented as a processing device comprising processor, memory and network interface components.

The exemplary flash-based hardware accelerated key-value store 180 and disk-based hardware accelerated key-value store 195 in the present embodiment are optionally arranged into first and second storage tiers, also denoted as Storage Tier 1 and Storage Tier 2, although it is to be appreciated that more than two storage tiers may be used in other embodiments. In addition, an embodiment of the invention can be configured with only one of the flash-based hardware accelerated key-value store 180 or disk-based hardware accelerated key-value store 195. Each of the exemplary flash-based hardware accelerated key-value store 180 and the disk-based hardware accelerated key-value store 195 may be viewed as being representative of an object storage target of a corresponding object storage server. The first and second storage tiers comprise respective disjoint subsets of the object storage servers.

The different storage tiers 180 and 195 in this embodiment comprise different types of storage devices having different performance characteristics. The flash storage devices of the storage tier 180 are generally significantly faster in terms of read and write access times than the disk storage devices of the storage tier 195. The flash storage devices are therefore considered "fast" devices in this embodiment relative to the "slow" disk storage devices. Accordingly, the exemplary partitioned key-value store 100 may be characterized in the present embodiment as having a "fast" storage tier 180 and a "slow" storage tier 195, where "fast" and "slow" in this context are relative terms and not intended to denote any particular absolute performance level. These storage tiers comprise respective disjoint subsets of object storage servers and their associated object storage targets. However, numerous alternative tiering arrangements may be used, including three or more tiers each providing a different level of performance. The particular storage devices used in a given storage tier may be varied in other embodiments and multiple distinct storage device types may be used within a single storage tier.

The flash storage devices in the exemplary flash storage tier 180 may be implemented, by way of example, using respective flash Peripheral Component Interconnect Express (PCIe) cards or other types of memory cards installed in a computer or other processing device that implements the corresponding object storage server. Numerous alternative arrangements are possible. Also, a variety of other types of non-volatile or volatile memory in any combination may be used to implement at least a portion of the flash-based hardware accelerated key-value store 180. Examples of alternatives to flash storage devices that may be used as respective object storage targets in other embodiments of the invention include non-volatile memories such as magnetic random access memory (MRAM) and phase change random access memory (PC-RAM).

The flash storage devices of the exemplary flash-based hardware accelerated key-value store 180 generally provide higher performance than the disk storage devices but the disk storage devices of the disk-based hardware accelerated key-value store 195 generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal, or the costs of implementing the system become excessive. Arrangements of this type can provide further acceleration of IO operations in the exemplary partitioned key-value store 100, leading to enhanced system performance relative to conventional arrangements, while additionally or alternatively providing an ability to achieve particular levels of performance at lower cost.

Figure 2:
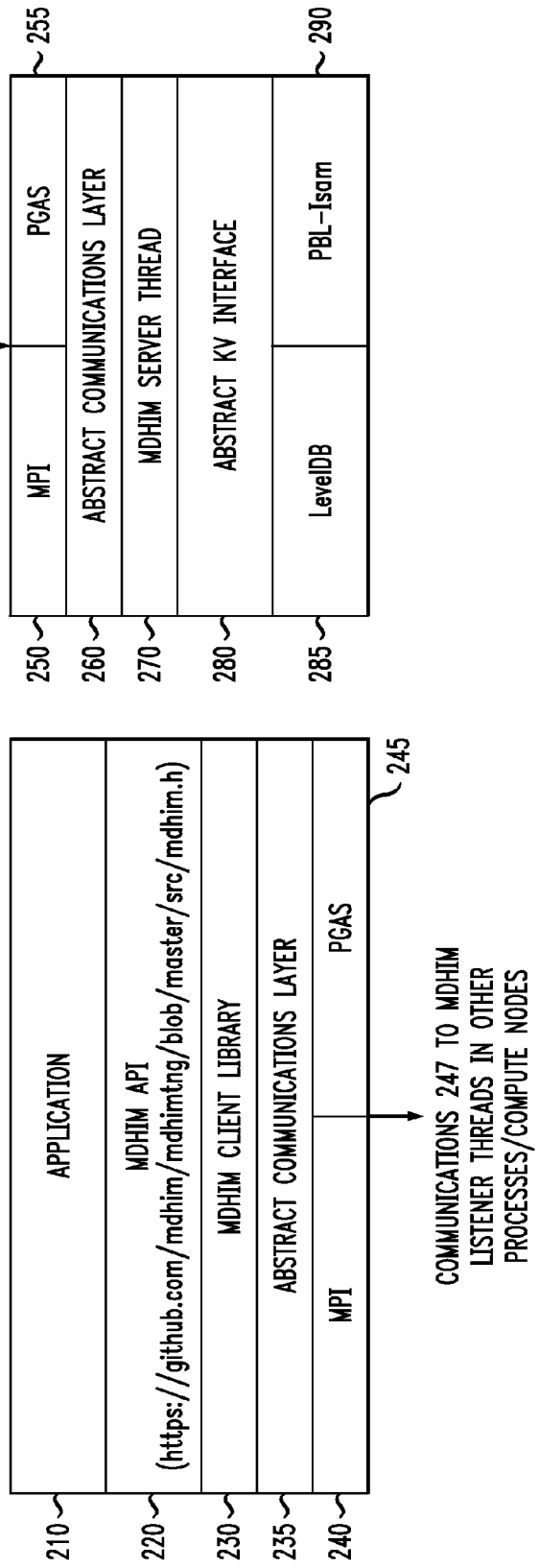
FIG. 2 illustrates an exemplary conventional architecture and application programming interface (API) for an MDHIM partitioned key-value store.

FIG. 2 illustrates an exemplary conventional architecture and application programming interface (API) for an MDHIM partitioned key-value store. Generally, an MDHIM framework employs one process address space, with the original process and the MDHIM listener thread in the same process space after the call to mdhim_init( ), which caused the MDHIM Listener thread to be spawned. Users run an MPI job and call mdhim_init( ) on every process/thread/MPI rank/compute node where an MDHIM server is desired.

MDHIM then spawns a listener thread to receive MDHIM communications 248 from other processes making calls to mdhim_such as mdhim_get or mdhim_put. As discussed further below, subsequent calls to mdhim (such as mdhim_put or mdhim_get) then create an MPI unexpected message which is sent to one of the MDHIM servers. MDHIM can run as client/server where each compute node is running both an MDHIM client and an MDHIM server.

MDHIM communications 248 from other processes are processed in a first layer comprising the Message Passing Interface (MPI) 250 or PGAS 255, followed by an abstract communications layer 260, MDHIM Server Thread 270, abstract key-value interface 280 and key-value operations such as leveldb 285 and Pbl-Isam 290, in a known manner.

Communications 247 to MDHIM Listener threads running in other processes/compute nodes are generated by an application 210 that provides messages to an MDHIM application programming interface (API) 220 using an MDHIM client library 230 and an abstract communications layer 235. Communications 247 are sent to other processes using the Message Passing Interface (MPI) 240 or PGAS 245.

The MDHIM application programming interface (API) 220 comprises the following exemplary operations:
- MDHIM init—initializes MDHIM structures and creates range server threads
- MDHIM_PUT—put one or more keys in a data store
- MDHIM_GET—get one or more keys from the data store
- MDHIM insert—a list function that inserts new records with key and record data
- MDHIM flush—makes key distribution information available to MDHIM clients
- MDHIM find—find a record using primary key (match, best higher or lower) and set the absolute record number
- MDHIM close—close an MDHIM file
- MDHIM read—a list function that read records (key and data), using absolute record numbers For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

An exemplary embodiment of the invention sorts the local key-values locally by the local store and globally by the overall MDHIM framework. The local and global sorting can be leveraged to provide batch input/output (IO) operations that aggregate multiple requests into batch operations on one or more sorted ranges. In this manner, desired data can be obtained using a reduced number of messages over the network. For a more detailed discussion of key sorting techniques, see, for example, U.S. patent application Ser. No. 14/143,758, filed Dec. 30, 2013, entitled "Partitioned Key-Value Store With One-Sided Communications for Secondary Global Key Lookup by Range-Knowledgeable Clients," incorporated by reference herein.

Embodiments of the present invention thus recognize that HPC applications typically will access contiguous sets of keys in parallel. Therefore, one process in an HPC job will access one sorted range and another will access a different sorted range. The global sort allows a better storage access pattern where each process only queries from a small set of the range server nodes. In addition, the local sort allows individual key requests to result in fewer storage operations.

Figure 3:
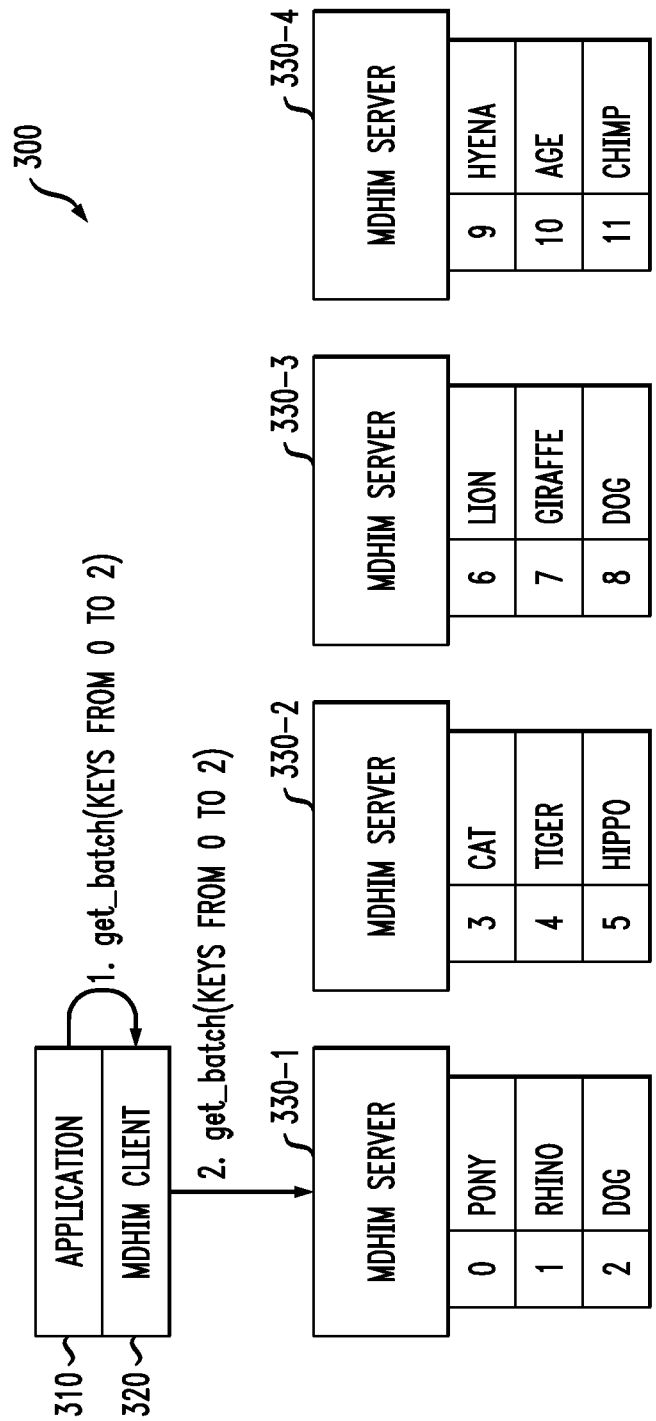
FIG. 3 illustrates the processing of a batch operation in an exemplary partitioned key-value store incorporating global sorting aspects of the invention.

FIG. 3 illustrates the processing of a batch operation in an exemplary partitioned key-value store 300 incorporating global sorting aspects of the invention. As shown in FIG. 3, the exemplary partitioned key-value store 300 comprises an exemplary application 310 executing, for example, on a compute node 160 that can read, write and/or query key-value data in the exemplary partitioned key-value store 300, using one or more MDHIM clients, such as the exemplary MDHIM client 320. One or more MDHIM servers 330-1 through 330-N (N is equal to 4 in the exemplary embodiment of FIG. 3) control the storage of key-value data.

The exemplary application 310 initially issues an aggregated "get batch" request to the client 320 during a first step, as follows:

get_batch(keys from 0 to 2)

The range-knowledgeable client 320 knows the keys in the range of 0-2 are stored by the first MDHIM server 330-1 and sends the get batch request to the appropriate server 330-1 during a second step, as follows:

get_batch(keys from 0 to 2)

In this manner, multiple requests are aggregated into "batches" to send fewer messages over the network.

Without a global sort, even if the application knows that it wants a sorted batch of keys, the MDHIM client must break this into multiple small individual requests to a large number of servers. The global sort provided by the present invention allows the single requests from the application 310 to the client 320 to become a single request over the network between one client 320 and one server 330-1.

Figure 4:
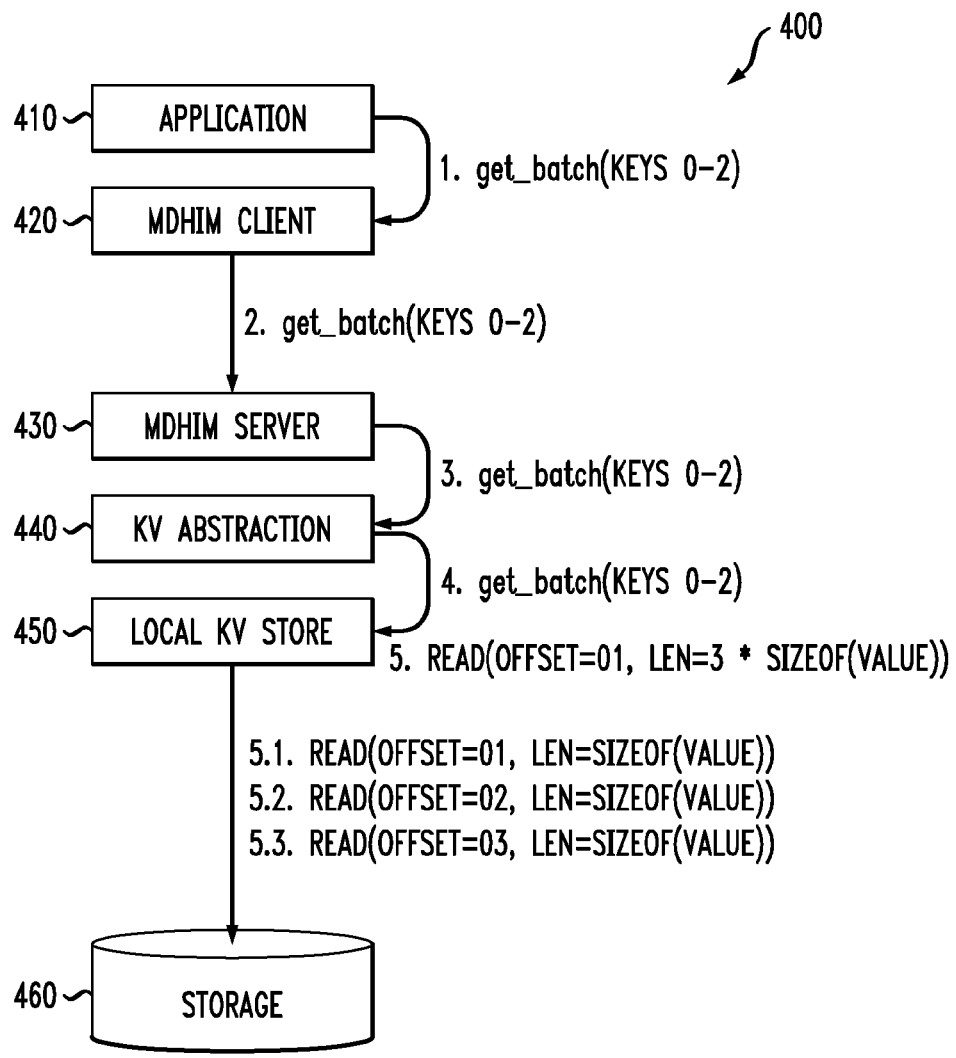
FIG. 4 illustrates the processing of another batch operation in an exemplary partitioned key-value store incorporating local sorting aspects of the invention.

FIG. 4 illustrates the processing of another batch operation in an exemplary partitioned key-value store 400 incorporating a local sorting feature. As shown in FIG. 4, the exemplary partitioned key-value store 400 comprises an exemplary application 410 executing on a compute node that can read, write and/or query key-value data in the exemplary partitioned key-value store 400, using one or more MDHIM clients, such as the exemplary MDHIM client 420. One or more MDHIM servers, such as MDHIM server 430, control the storage of key-value data.

The exemplary application 410 initially issues an aggregated "get batch" request to the client 420 during a first step, as follows:

get_batch(keys from 0 to 2)

The range-knowledgeable client 420 knows the keys in the range of 0-2 are stored by the MDHIM server 430 and sends the get batch request to the appropriate server 430 during a second step, as follows:

get_batch(keys from 0 to 2)

The range-knowledgeable client 420 employs a key-value abstraction 440 and a local key-value store 450 to access the key-value data. The MDHIM server 430 stores the logical table, but physically the local key-value store 450 is storing the data for this logical table on a storage device 460, such as a disk of the disk-based hardware accelerated key-value store 195. According to one aspect of the invention, the local key-value stores 450 are internally sorted so that the local KV store 450 will issue fewer requests to the storage device 460. When the local key-value store 450 does not store sorted key-values, the following requests are issued during step 5:

5.1. read(offset=01, len=sizeof(value))
5.2. read(offset=02, len=sizeof(value))
5.3. read(offset=03, len=sizeof(value))

Thus, there are three random reads to the actual storage device 460 with conventional techniques.

When a sorted local key-value store 450 is used in accordance with an embodiment of the present invention, only the following single request is issued during step 5:

5. read(offset=01, len=3*sizeof(value))

Figure 5:
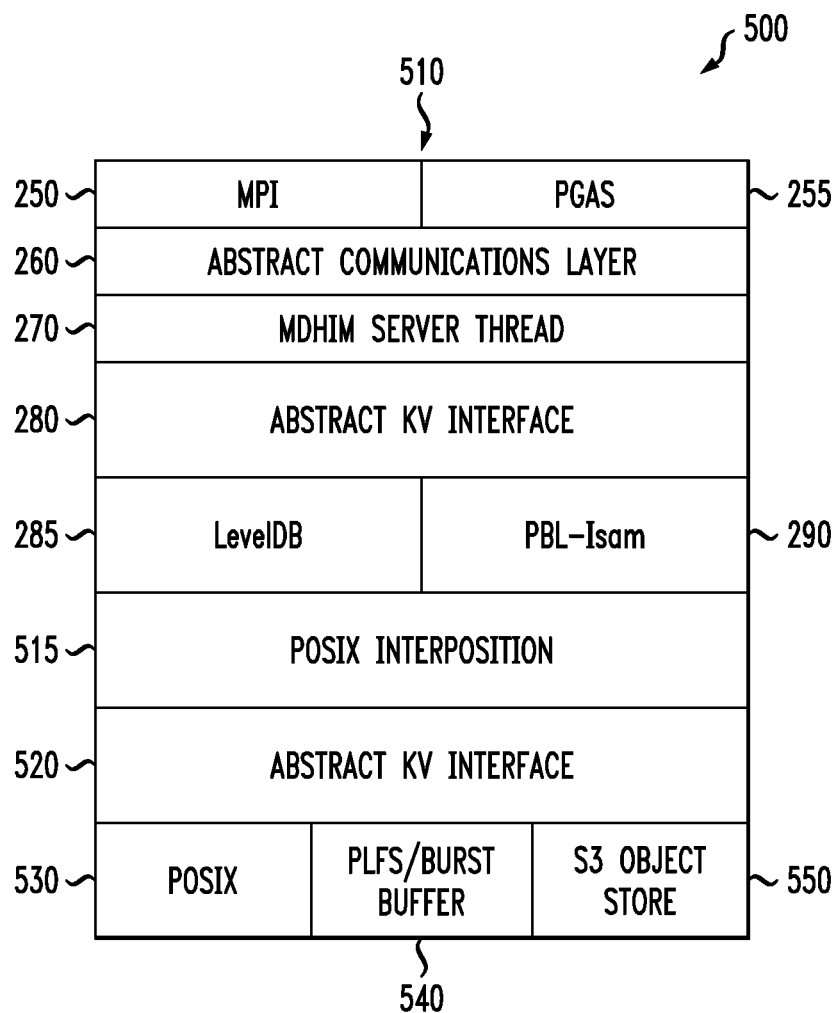
FIG. 5 illustrates the MDHIM layers for processing communications from other processes making calls in accordance with a storage architecture interface aspect of the invention.

FIG. 5 illustrates the MDHIM layers 500 for processing communications 510 from other processes making calls in accordance with a storage architecture interface aspect of the invention. As discussed above in conjunction with FIG. 2, MDHIM spawns a listener thread to receive MDHIM communications 510 from other processes making calls to mdhim, such as mdhim_get or mdhim_put. MDHIM communications 510 from other processes are processed in a first layer comprising the Message Passing Interface (MPI) 250 or PGAS 255, followed by an abstract communications layer 260, MDHIM Server Thread 270, abstract key-value interface 280 and key-value operations, such as leveldb 285 and Pbl-Isam 290, in a similar manner to FIG. 2.

A Portable Operating System Interface (POSIX) is a family of IEEE standards for maintaining compatibility between operating systems. POSIX defines the application programming interface (API), along with command line shells and utility interfaces, for software compatibility with variants of Unix and other operating systems. Thus, a POSIX interposition 515 layer is provided below key-value operations, such as leveldb 285 and Pbl-Isam 290, followed by an abstract storage interface 520. The abstract storage interface 520 allows the existing framework to run in a variety of environments, such as POSIX 530, and to leverage additional storage architectures, such as PLFS/Burst Buffer 540 and emerging object stores, such as S3 Object Store 550. The abstract storage interface 520 performs the necessary conversions/translations to leverage, for example, a burst buffer and object stores.

In this manner, one or more servers in the disclosed partitioned key-value store provide an interface between one or more local key-value stores and one or more additional storage architectures, including hardware accelerated storage. In one exemplary embodiment, one or more servers in the disclosed partitioned key-value store optionally provide a key value interface that provides access to at least one hardware accelerator key-value store.

Figure 6:
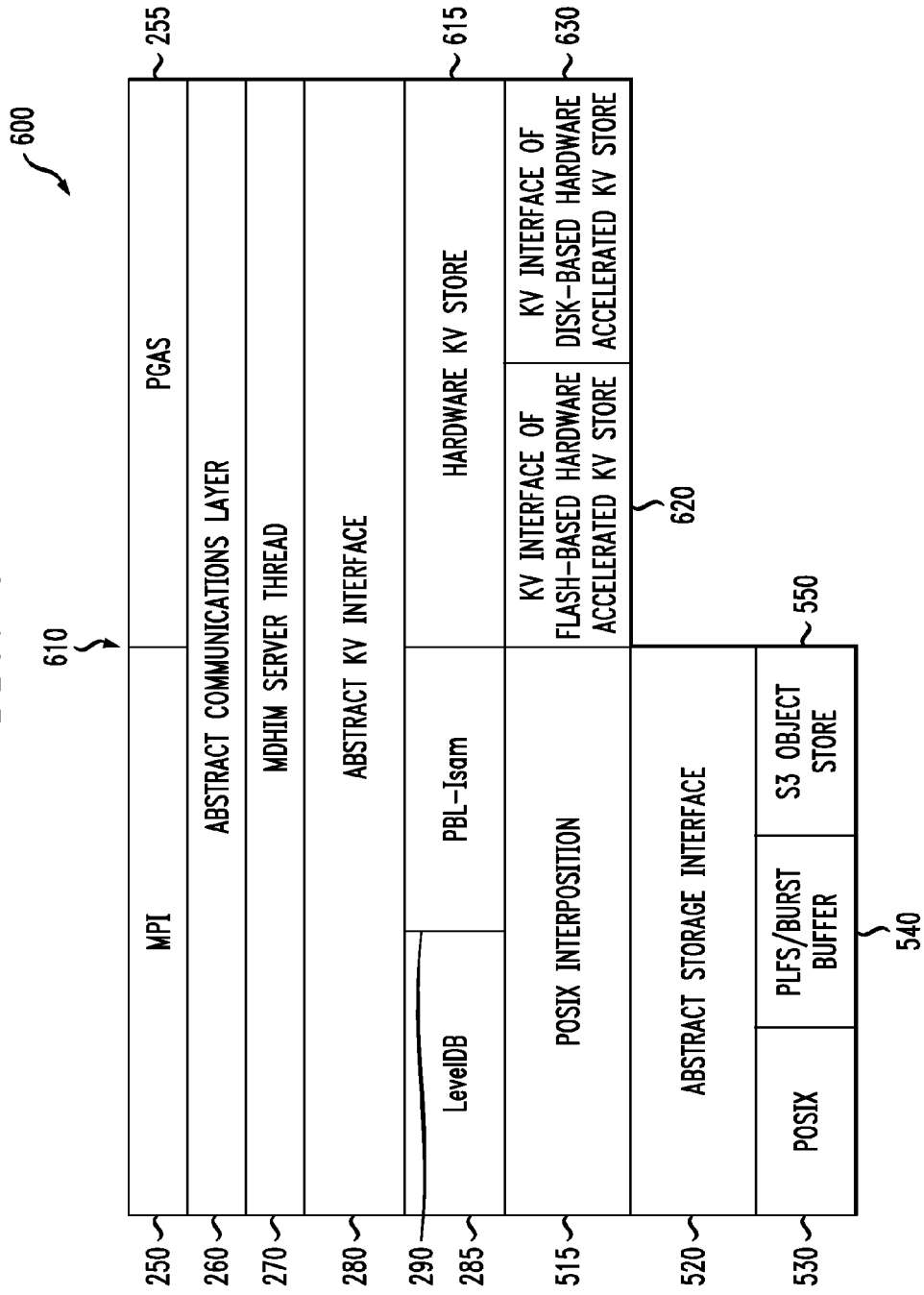
FIG. 6 illustrates the MDHIM layers for processing communications from other processes making calls in accordance with a hardware key-value store interface aspect of the invention.

FIG. 6 illustrates the MDHIM layers 600 for processing communications 610 from other processes making calls in accordance with a hardware key-value store interface aspect of the invention. As discussed above in conjunction with FIG. 2, MDHIM spawns a listener thread to receive MDHIM communications 610 from other processes making calls to mdhim, such as mdhim_get or mdhim_put. MDHIM communications 610 from other processes are processed in a first layer comprising the Message Passing Interface (MPI) 250 or PGAS 255, followed by an abstract communications layer 260, MDHIM Server Thread 270, abstract key-value interface 280 and key-value operations, such as leveldb 285 and Pbl-Isam 290, in a similar manner to FIG. 2.

In addition, a POSIX interposition 515 layer is provided below key-value operations, such as leveldb 285 and Pbl-Isam 290, followed by an abstract storage interface 520. The abstract storage interface 520 allows the existing framework to run in a variety of environments, such as POSIX 530, and to leverage additional storage architectures, such as PLFS/Burst Buffer 540 and emerging object stores, such as S3 Object Store 550, in a similar manner to FIG. 5.

The Abstract KV Interface 280 also provides an interface to a hardware key-value Store 615, connected to a key-value interface 620 of a flash-based hardware accelerated key-value store 180 and/or a key-value interface 630 of a disk-based hardware accelerated key-value store 195.

FIG. 7 illustrates exemplary pseudo code 700 for implementing a multi-tier hardware accelerated partitioned key-value store. As shown in FIG. 7, the exemplary pseudo code 700 comprises a switch command for handling a number of exemplary cases, such as leveldb 285, Pbl-Isam 290, flash-based hardware accelerated key-value store 180 and/or disk-based hardware accelerated key-value store 195. As shown in FIG. 7, the exemplary conventional cases, such as leveldb 285 and Pbl-Isam 290, require an extensive software stack, while the flash-based hardware accelerated key-value store 180 and/or disk-based hardware accelerated key-value store 195 provided by the exemplary embodiments of the present invention allow direct access to the hardware layer.

It is to be appreciated that the particular operations and associated messaging illustrated herein are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the partitioned key-value stores of the present invention. Such components can communicate with other elements of the partitioned key-value store over any type of network or other communication media.

As indicated previously, components of a partitioned key-value store 100 as disclosed herein can be implemented at least in part in the form of one or more software programs stored in memory and executed by a processor of a processing device. A memory having such program code embodied therein is an example of what is more generally referred to herein as a "computer program product."

The partitioned key-value store 100 or portions thereof may be implemented using one or more processing platforms each comprising a plurality of processing devices. Each such processing device may comprise processor, memory and/or network interface components.

As indicated above, multi-tier storage of key-value data using hardware accelerated storage such as that described herein can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of partitioned key-value stores and associated clients, servers and other processing devices that can benefit from the secondary global key look-up functionality as described herein. Also, the particular configurations of system and device elements shown in FIG. 1 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A distributed storage system for storing a partitioned key-value store, comprising:
at least one compute node comprising a partitioned key-value store server;
the partitioned key-value store server comprising at least one processor executing one or more instructions in communication with a memory to provide a key-value interface to provide key-value data in a key-value format to at least one hardware accelerated key-value store that communicates using said key-value format, wherein said partitioned key-value store server comprises a given partition corresponding to a distinct range of keys, and wherein a range-knowledgeable client executing in said distributed storage system knows that said partitioned key-value store server stores said distinct range of keys, and sends one or more requests for key-value data within said distinct range of keys directly to said partitioned key-value store server.

2. The distributed storage system of claim 1, wherein said hardware accelerated key-value store comprises one or more of a flash-based hardware accelerated key-value store and a disk-based hardware accelerated key-value store.

3. The distributed storage system of claim 2, wherein said flash-based hardware accelerated key-value store and said disk-based hardware accelerated key-value store comprise respective disjoint subsets of storage.

4. The distributed storage system of claim 2, wherein data is stored in one of said flash-based hardware accelerated key-value store and said disk-based hardware accelerated key-value store based on one or more tiering commands from said partitioned key-value store server.

5. The distributed storage system of claim 1, wherein said at least one compute node further comprises a key-value store for generating one or more of read and write commands for said flash-based hardware accelerated key-value store and said disk-based hardware accelerated key-value store.

6. The distributed storage system of claim 1, wherein the partitioned key-value store server is further configured to communicate with a plurality of partitioned key-value store clients over a network and to process requests from said partitioned key-value store clients.

7. The distributed storage system of claim 1, wherein the partitioned key-value store server is further configured to communicate with one or more additional partitioned key-value store servers over a network and to process requests from said one or more additional partitioned key-value store servers.

8. The distributed storage system of claim 1, further comprising a plurality of said partitioned key-value store servers, wherein each partitioned key-value store server stores a globally sorted range of keys in said partitioned key-value store.

9. The distributed storage system of claim 8, further comprising a plurality of partitioned key-value store servers, wherein each partitioned key-value store server stores a locally sorted range of keys.

10. The distributed storage system of claim 1, further comprising a plurality of partitioned key-value store servers, wherein at least one partitioned key-value store server provides an interface between one or more local key-value stores and at least one of said flash-based hardware accelerated key-value store and said disk-based hardware accelerated key-value store.

11. The distributed storage system of claim 1, further comprising a plurality of partitioned key-value store servers, wherein at least one partitioned key-value store server provides a key-value interface that provides access to at least one hardware key-value store.

12. The distributed storage system of claim 1, further comprising a plurality of partitioned key-value store servers, wherein at least one partitioned key-value store server processes one or more batch operations on one or more sorted ranges of said partitioned key-value store.

13. A method comprising:
providing a partitioned key-value store server on a compute node of a distributed storage system; and
configuring said partitioned key-value store server to store key-value data on at least one hardware accelerated key-value store, wherein the partitioned key-value store server is configured to provide a key-value interface to provide key-value data in a key-value format to at least one hardware accelerated key-value store that communicates using said key-value format, wherein said partitioned key-value store server comprises a given partition corresponding to a distinct range of keys, and wherein a range-knowledgeable client executing in said distributed storage system knows that said partitioned key-value store server stores said distinct range of keys, and sends one or more requests for key-value data within said distinct range of keys directly to said partitioned key-value store server.

14. The method of claim 13, wherein said hardware accelerated key-value store comprises one or more of a flash-based hardware accelerated key-value store and a disk-based hardware accelerated key-value store.

15. The method of claim 14, wherein said flash-based hardware accelerated key-value store and said disk-based hardware accelerated key-value store comprise respective disjoint subsets of storage.

16. The method of claim 14, wherein data is stored in one of said flash-based hardware accelerated key-value store and said disk-based hardware accelerated key-value store based on one or more tiering commands from said partitioned key-value store server.

17. The method of claim 13, wherein said at least one compute node further comprises a local key-value store for generating one or more read and write commands for said flash-based hardware accelerated key-value store and said disk-based hardware accelerated key-value store.

18. The method of claim 13, further comprising a plurality of said partitioned key-value store servers, wherein each partitioned key-value store server stores a globally sorted range of keys in said partitioned key-value store.

19. The method of claim 13, further comprising a plurality of partitioned key-value store servers, wherein at least one partitioned key-value store server provides an interface between one or more local key-value stores and at least one of said flash-based hardware accelerated key-value store and said disk-based hardware accelerated key-value store.

20. A partitioned key-value store apparatus comprising:
a plurality of compute nodes connected via a network, at least one of said plurality of compute nodes comprising a partitioned key-value store server;
the partitioned key-value store server comprising at least one processor executing one or more instructions in communication with a memory to store key-value data on at least one hardware accelerated key-value store, wherein the partitioned key-value store server is configured to provide a key-value interface to provide key-value data in a key-value format to at least one hardware accelerated key-value store that communicates using said key-value format, wherein said partitioned key-value store server comprises a given partition corresponding to a distinct range of keys, and wherein a range-knowledgeable client executing in said distributed storage system knows that said partitioned key-value store server stores said distinct range of keys, and sends one or more requests for key-value data within said distinct range of keys directly to said partitioned key-value store server.

\* \* \* \* \*